United States Patent [19]

McEathron

[11] 4,127,308
[45] Nov. 28, 1978

[54] FLUID BRAKE CONTROL SYSTEM

[75] Inventor: Eugene D. McEathron, Watertown, N.Y.

[73] Assignee: General Signal Corporation, Rochester, N.Y.

[21] Appl. No.: 842,761

[22] Filed: Oct. 17, 1977

Related U.S. Application Data

[63] Continuation of Ser. No. 731,618, Oct. 13, 1976, abandoned.

[51] Int. Cl.$^2$ ............................................. B60T 15/22
[52] U.S. Cl. .................................. 303/35; 303/22 R; 303/57
[58] Field of Search .......................... 303/22 R, 33–39, 303/44, 57, 59, 62, 64–66, 81, 85

[56] References Cited

U.S. PATENT DOCUMENTS

| | | | |
|---|---|---|---|
| 2,992,861 | 7/1961 | Hursen | 303/33 |
| 3,966,269 | 6/1976 | McEathron | 303/37 |
| 3,966,270 | 6/1976 | McEathron | 303/69 |
| 3,966,271 | 6/1976 | McEathron | 303/69 |
| 3,967,864 | 7/1976 | McEathron | 303/81 |
| 3,985,401 | 10/1976 | Worbois | 303/57 |

OTHER PUBLICATIONS

New York Air Brake Company, Instruction Pamphlet No. 5050-7, Sept. 1948, *D-22-P Passenger Car Brake Equipment.*

*Primary Examiner*—Duane A. Reger
*Attorney, Agent, or Firm*—Harold S. Wynn

[57] ABSTRACT

A fluid brake control system is disclosed for governing application and release of brakes of an interchange vehicle having a brake control pipe, an auxiliary fluid reservoir, a fluid brake cylinder, and a brake control device sensing changes in fluid pressure in the brake pipe for at times governing application of fluid to the brake cylinder from the auxiliary reservoir and at other times for releasing fluid from the brake cylinder. Additional first and second volume chambers are provided that are proportionally smaller in volume than the auxiliary reservoir and brake cylinder displacement volumes respectively. Valve governed passageways are provided for normally charging the first volume chamber from the brake pipe and for preventing fluid flow from the auxiliary reservoir to the first volume chamber. The second volume chamber is charged from the first volume chamber upon sensing a reduction of pressure in the brake pipe at a rate to reduce pressure in the first volume chamber proportional to a service rate of reduction in the brake pipe, and relay control apparatus is provided for sensing a difference in fluid pressure between the brake cylinder pressure and pressure in the second volume chamber for governing the flow of fluid from the auxiliary reservoir to the brake cylinder.

An emergency application is obtained by the use of sequenced proportioning valves wherein the brake cylinder is pressurized first from the auxiliary reservoir and then from an emergency reservoir.

Apparatus is provided by which the second volume chamber can have its effective volume varied in accordance with the weight of the vehicle.

51 Claims, 3 Drawing Figures

FLUID BRAKE CONTROL SYSTEM

This is a continuation of application Ser. No. 731,618, filed Oct. 13, 1976, now abandoned.

REFERENCE TO PRIOR CASES

This invention relates to my prior U.S. Pat. Nos. 3,966,269, 3,966,270, 3,966,271, and 3,967,864 and my copending U.S. application Ser. No. 648,844, filed Jan. 14, 1976 which are incorporated herein by reference.

BACKGROUND OF THE INVENTION

This invention relates to fluid brake control systems, and while the invention is subject to a wide range of applications, a preferred embodiment of the invention will be particularly described as applied to a fluid brake control system having improved displacement control apparatus.

Fundamentally, air brake systems for interchange rail vehicles are of the displacement type in that a full service brake application, for example, is attained when pressure in an auxiliary reservoir is equalized with pressure after displacement of a piston in each of one or more brake cylinders of a vehicle upon application of the brakes, and an emergency application is attained by equalizing the pressures of both an emergency reservoir and the auxiliary reservoir with pressure of the brake cylinders in combination with use of an inshot valve to limit the rate of build-up of brake cylinder pressure when it is being supplied with fluid from the auxiliary reservoir and the emergency reservoir at the same time. This provides for the most uniform calibration of brakes, with adequate reserve for leakage of fluid, of all vehicles in a train and is currently obtained by well-known AB and ABD control valves.

An alternate form of braking has been used more particularly in passenger vehicle control valves, such as in the well-known D22-AR control valve (disclosed in New York Air Brake Instruction Pamphlet No. 5050-7). This type of a valve uses the displacement principle in the control of a relay valve, which in turn governs brake cylinder pressure. This is accomplished by equalizing the auxiliary reservoir pressure with the pressure of a displacement reservoir having a volume equal to brake cylinder piston displacement volume for a full service brake application, and by equalizing pressures of the auxiliary reservoir, the emergency reservoir, and the displacement reservoir for an emergency brake application. The relay valve is controlled by the displacement reservoir pressure to deliver fluid from one or more supply reservoirs to one or more brake cylinders. This maintains the brake cylinders at a predetermined pressure ratio relative to the pressure of the displacement reservoir.

An object of the present invention is to provide a fluid brake control system which substantially obviates one or more of the limitations and disadvantages of the described prior systems.

Another object of the present invention is to reduce the amount of air required for brake applications.

Another object of the present invention is to reduce the time required for the application and release of brakes of a vehicle.

Other objects, purposes and characteristic features of the present invention will be in part obvious from the accompanying drawings and in part pointed out as the description of the invention progresses.

SUMMARY OF INVENTION

A fluid brake control system is provided for governing application and release of brakes of an interchange vehicle having a brake control pipe, an auxiliary fluid reservoir, a fluid brake cylinder, and a brake control device sensing changes in fluid pressure in the brake pipe for at times governing application of fluid to the brake cylinder from the auxiliary reservoir and at other times for releasing fluid from the brake cylinder. First and second volume chambers are provided that are proportionally smaller in volume than the auxiliary reservoir and brake cylinder displacement volumes respectively. Valve controlled passages are provided for normally charging the first volume chamber from the brake pipe and for preventing fluid flow from the auxiliary reservoir to the first volume chamber. Valve controlled passages are also provided for charging the second volume chamber from the first volume chamber upon sensing a reduction of pressure in the brake pipe at a rate to reduce pressure in the first volume chamber proportional to a service rate of reduction in the brake pipe. A relay valve and control passages are provided for sensing a difference in fluid pressure between brake cylinder pressure and pressure in the second volume chamber and in accordance therewith for governing delivery of fluid from the auxiliary reservoir to the brake cylinder. By this organization the brake cylinder can be maintained substantially at service brake pressure when pressures in the first and second volumes are equalized, irrespective of pressure in the auxiliary reservoir.

In response to sensing an emergency rate of reduction in the brake pipe, emergency braking pressure is built up in the brake cylinder, first by fluid from the auxiliary reservoir and then by fluid from the emergency reservoir as determined by a proportioning valve device, thus making it unnecessary to have a conventional inshot valve.

The second volume chamber can have its volume made variable in accordance with the load of the associated vehicle to provide lower braking pressures for lightly loaded vehicles.

For a better understanding of the present invention, together with other and further objects thereof, reference is had to the following description taken in connection with the accompanying drawings, while its scope will be pointed out in the appending claims.

Figure 1A:
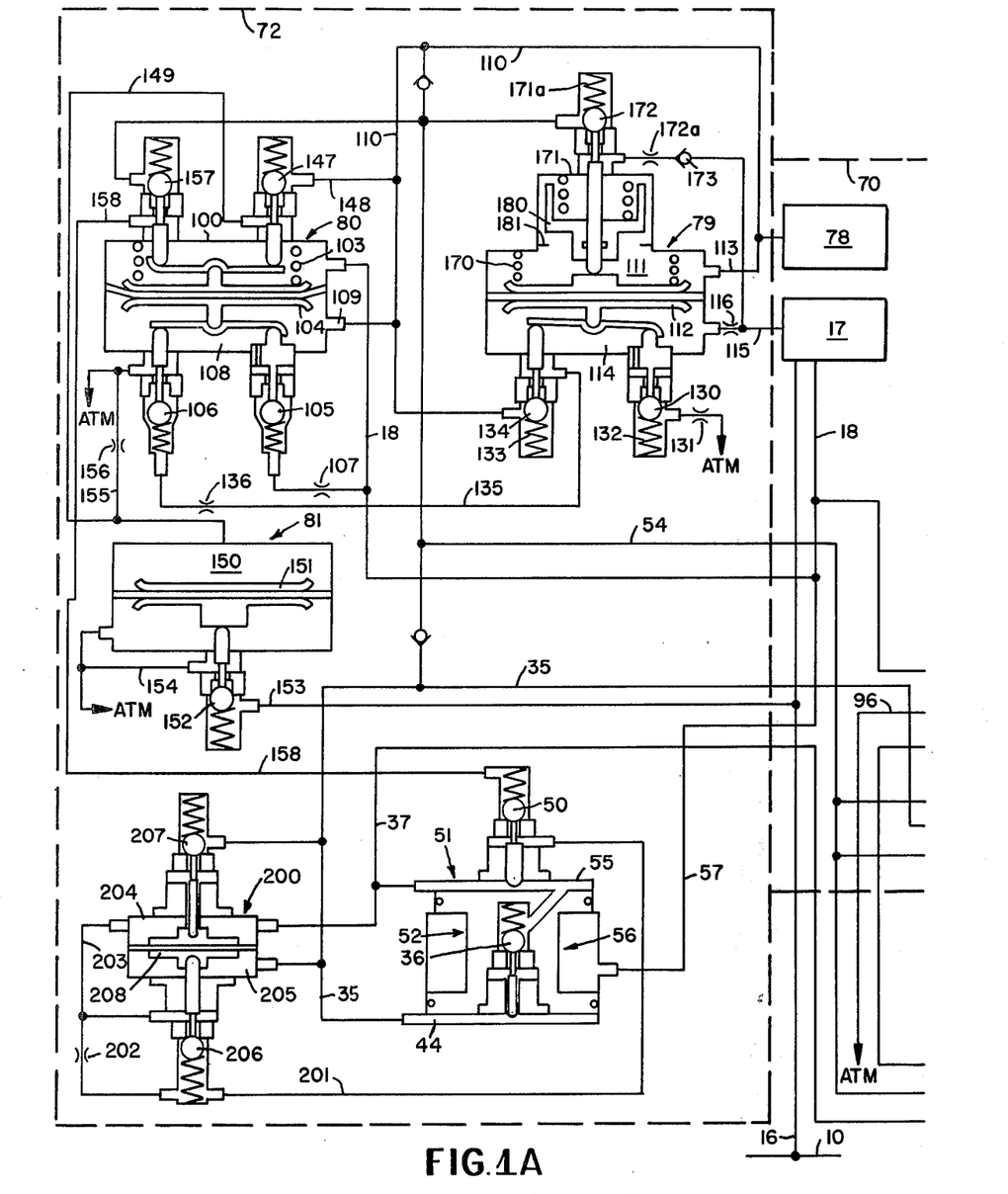
FIGS. 1A and 1B, when placed side-by-side, illustrate schematically a brake control device for a railway vehicle according to a preferred embodiment of the present invention.
Figure 1B:
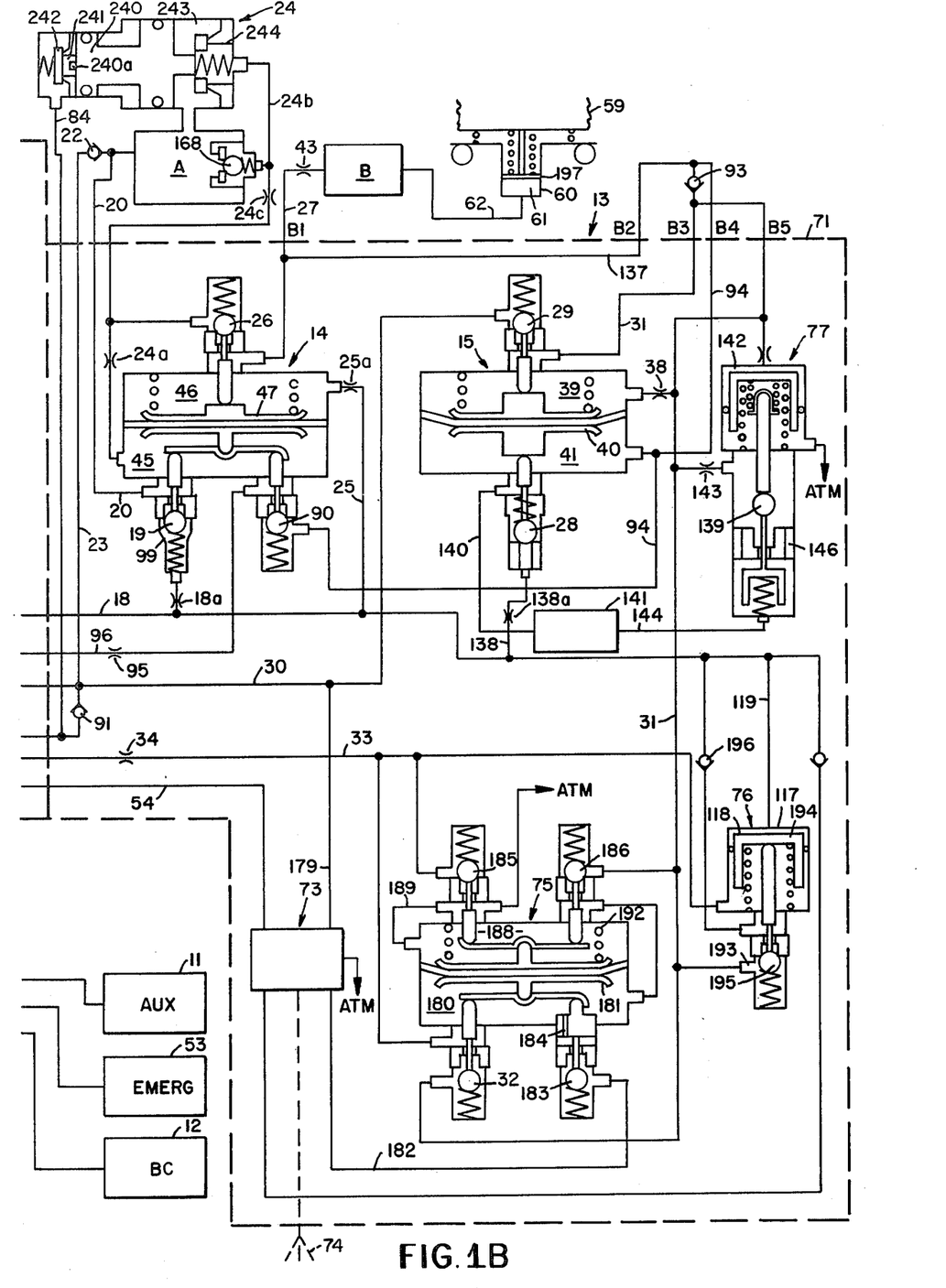

With reference to FIGS. 1A and 1B, a fluid brake control system is illustrated as a preferred embodiment of the present invention having a brake control pipe 10, an auxiliary fluid reservoir 11, a fluid brake cylinder 12, and a brake control device 13 sensing changes in fluid pressure in the brake pipe 10 for a times governing application of fluid to the brake cylinder 12 from the auxiliary reservoir 11, and at other times for releasing fluid from the brake cylinder 12.

First and second volume chambers A and B are associated with the brake control device 13 as by being secured to the outside thereof, these chambers being proportionally smaller in volume than the auxiliary reservoir 11 and brake cylinder 12 displacement volumes respectively. The first volume chamber A is charged, when the brake pipe pressure exceeds the first volume chamber A pressure, as sensed by an application, charging, and release device 14, from the brake pipe 10, through passage 16, air cleaner chamber 17, passage 18, choke 18a charge valve 19 in its open position, and passage 20. The auxiliary reservoir 11 is also charged by this same circuit but through check valve 22 and passage 23.

The second volume chamber B is charged from the first volume chamber A when the application, charging, and release device 14 senses a reduction in brake pipe pressure relative to the pressure in the first volume chamber A. The first volume chamber A is connected to the lower chamber 45 of device 14 through a first proportioning valve 24, a passage 24b, a choke 24c and a choke 24a, and the brake pipe 10 is connected to the upper chamber 46 of valve 14 through passages 18 and 25 and choke 25a. Movement upwardly of abutment 47 of device 14 opens valve 26 to apply fluid from chamber A to chamber B through proportioning valve 24, passages 24b and 27 and a choke 43.

It has been stated that the volume chambers A and B are proportionately smaller than the auxiliary reservoir and brake cylinder 12 displacement volumes respectively. Thus typically, volumes A and B can be 280 cubic inches and 112 cubic inches respectively, which are proportionately comparable to conventional auxiliary reservoir 11 and brake cylinder 12 displacement volumes of 2500 cubic inches and 1000 cubic inches respectively.

These volumes can be expressed as related to initial auxiliary reservoir pressure and full service braking pressure at equalization as:

$$P_A (V_A) = P_{BC}(V_{BC} + V_A)$$

or $$P_A/P_{BC} = (V_{BC} + V_A)/V_A$$

where $P_A$ is normal auxiliary reservoir pressure
$P_{BC}$ is brake cylinder pressure at equalization (full service)
$V_A$ is auxiliary reservoir volume
$V_{BC}$ is brake cylinder displacement volume.

Substituting values in a conventional displacement system:

$$70/50 = (1000 + 2500)/2500 = 1.4 \text{ ratio}$$

Substituting values of volume chambers A and B for values of auxiliary reservoir and brake cylinder displacement we have:

$$70/50 = (112 + 280)/280 = 1.4 \text{ ratio}$$

If it is assumed that a weight adjusted volume 61 is used to provide load proportioned braking, this volume is reduced substantially to zero for a heavy vehicle but is expanded for a light vehicle to apply, for example, as little as 60% of the full service pressure of 50 pounds to the brake cylinder 12 which is 30 pounds pressure. This additional volume of chamber 61 can be calculated as follows:

$$20V_A = P_{BC} V_B + (P_{BC} + 14.7) V_L$$

$P_{BC} = 30$ pounds pressure
$V_L = 50.1$ cubic inches where
$V_L$ is the volume of chamber 61 for an empty vehicle.
20 pounds is the normal full service reduction.

A service relay device 15 senses a difference in fluid pressure between the pressure in brake cylinder 12 and pressure in the second volume chamber B to open a quick service valve 28 and open a valve 29 for delivering fluid from the auxiliary reservoir 11 through passage 30, and valve 29 to a service application passage 31. The service application passage 31 is connected through an application cut off valve 32 that is normally open to a brake cylinder passage 33. Passage 33 is connected to the brake cylinder 12 through a choke 34, passage 35 a normally open valve 36, in a proportioning valve device 51, and passage 37. Brake cylinder pressure in passage 31 is applied through a choke 38 to a chamber 39 above abutment 40 of the relay valve 15. A lower chamber 41 of this valve is connected by passages 94 and 27 to the second volume chamber B through choke 43. Chamber 39 plus the stabilizing spring and chamber 41 of relay valve device 15 become equalized to lap relay valve 29 when the brake cylinder pressure is substantially equalized with the pressure of the second volume chamber B.

An emergency application is provided by sequentially charging brake cylinder 12 through a service cut off valve device 200 and proportioning valve device 51. This causes the brake cylinder to be pressurized from the auxiliary reservoir as under a service brake application until it approaches full service brake cylinder pressure. Upon depletion of brake pipe pressure that normally holds piston 52 of proportioning valve device 51 down, the piston 52 moves upwardly, closing valve 36, and thus causing auxiliary reservoir pressure to build up in passage 35. This pressure is applied to chamber 205 beneath abutment 208 in cut-off valve 200 to cause that abutment to move upwardly, opening valve 207 and closing valve 206. This permits air to flow from the auxiliary reservoir 11, through application passage 35, valve 207, chamber 204 above abutment 208, and passage 37 to brake cylinder 12. Valve 50 is opened by actuation of piston 52 of valve device 51 upwardly to supply fluid from an emergency reservoir 53 over passage 54 through valve 157 of emergency application and stability device 80, passage 158, valve 50 of proportioning valve device 51, passage 201, choke 202, passage 203, chamber 204 of device 200, and passage 37 to brake cylinder 12.

When pressure in chamber 204 equals pressure in chamber 205, and flow of fluid from the auxiliary reservoir 11 has almost stopped, abutment 208 of device 200 starts to move down because emergency reservoir fluid flow through choke 202 builds up a pressure in chamber 204 that is higher than pressure in chamber 205. This closes valve 207 and opens valve 206, thus causing the cutting off of the auxiliary reservoir 11 when pressure in passage 35, chamber 205 and chamber 44 is substantially equal to full service brake application pressure. The opening of valve 206 causes flow of fluid from the emergency reservoir 53 through passage 203, chamber 204, and passage 37 to brake cylinder 12 and also to chamber 55 above stepped piston 52 of the proportioning valve device 51. Proportioning valve device 51 allows emergency reservoir fluid to flow to brake cylinder 12 until pressure in chamber 55 (brake cylinder pressure) is 20 percent greater than the force applied on the larger end of piston 52 in chamber 44, at which time piston 52 moves downwardly to a lap position, closing valve 50. The valve device 50 is prevented from operating during a service application because of an intermediate pressure chamber 56 that is pressurized from the brake pipe 10 over passages 18 and 57.

If the system according to the present invention is used on a vehicle 59 (see FIG. 1B) having a load sensing cylinder 60, the connection of a load variable volume 61 through passage 62 to the volume chamber B provides that the effective volume of chamber B is variable in accordance with the load of the vehicle 59, and thus the relative pressure of fluid in the brake cylinder 12 is varied accordingly.

Having thus considered the general mode of operation using the volume A and B in the control of brake cylinder pressure, the system components will now be more specifically described, first relative to the organization of the structure, and then relative to operation in the different modes of the system.

With reference to FIGS. 1A and 1B, the control device 13 comprises a conventional pipe bracket 70 to which is assembled a service portion 71 and an emergency portion 72. In addition to the multiple valve devices 14 and 15 that have been discussed, the service portion 71 also has a conventional manual release valve 73 operable by an associated manual control lever 74, and an associated brake cylinder release device 75. The brake cylinder control device 75 has associated therewith a reset device 76. A service limiting device 77 is provided for governing initial charging of the brake cylinder 12 from the brake pipe 10 in making a service brake application.

The pipe bracket 70 comprises a usual quick action chamber 78 as well as a brake pipe air cleaner chamber 17.

The emergency portion 72 of the valve device 13 comprises, in addition to the service cut-off valve device 201 and emergency proportioning valve device 51, that have been discussed, a combined quick service and accelerated release valve device 79, an emergency application and stability device 80, and emergency vent control device 81.

Figure 2:
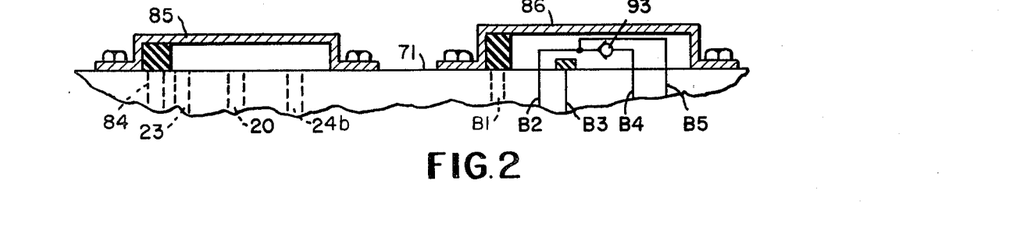
FIG. 2 is a plan view of a portion of the brake control device of FIGS. 1A and 1B showing modified fluid passages.

FIG. 2 illustrates a provision for modification of the system according to the present invention to convert the valve device 13 of FIGS. 1A and 1B to a conventional displacement valve control system that does not use the chambers A and B. To accomplish this, as shown in FIG. 2, a cover 85 is provided for connecting passages 20, 23, 24b and covering passage 84. A cover 86 is provided for covering ports B1 and B3, and connecting port B2 to port B5, and to port B4 through check valve 93. The mode of operation of the system, with these modifications, will be hereinafter considered.

BRAKE CYLINDER RELEASE AND CHARGING

When pressure in brake pipe 10 increases to a level sufficient to deflect the abutment 47 downwardly of device 14, charging and brake cylinder exhaust valves 19 and 90 respectively are opened. Charging of the auxiliary reservoir 11 and chamber A takes place as has been described, and in addition, emergency reservoir 53 is charged through check valve 91 and passage 54. The opening of valve 90 vents the brake cylinder 12 to atmosphere through passage 37, valve 36, passage 35, service choke 34, passage 33 normally open valve 32 of the brake cylinder release device 75, passage 31, check valve 93, passage 94, valve 90, exhaust choke 95, passage 96 and a retaining valve (not shown).

If the pressure differential is high enough in chamber 46 of device 14, the abutment 47 is forced downwardly to an extent to actuate the valve 19 to its retarded recharge seat 99 to reduce the rate of charge for vehicles near the head of a train to provide more even distribution of charging throughout the train.

Air from the brake pipe 10 is also applied to chamber 100 of the emergency application and stability device 80 through passage 16, filter 17, and passage 18. A stability spring 103 biases abutment 104 downwardly in the emergency device 80, thus normally opening the lower valves 105 and 106. Air from brake pipe 10 is applied through passage 18, choke 107 and valve 105 to chamber 108 beneath abutment 104 and through outlet port 109 of this chamber and passage 110 to charge the quick action chamber 78. Chamber 111 above abutment 112 of device 79 is charged with fluid from the quick action chamber 78 through passage 113. A chamber 114 below abutment 112 is charged to brake pipe pressure from the brake pipe filter chamber 17 through passage 115 and choke 116. Pressure from the brake pipe 10 is also applied in the service portion 71 to a chamber 117 above a piston 118 in the reset device 76 through passage 18 from the brake pipe air filter chamber 17 and passage 119.

After the charging has been completed, equalization of pressures above and below the abutment 47 of application charging and release device 14 causes the abutment 47 to be restored to its position as shown in the drawings, with the valves above and below the abutment 47 in their closed positions. However, valve 90 can be adjusted to be biased by slightly lighter spring pressure than valve 99 to provide that it is normally partly open to vent chamber B and application passage 31. Any pressures that may develop during normal conditions in the brake application passage 31 associated with the relay device 15 are relieved through the check valve 93, passage 94, valve 90, choke 95 and passage 96, to atmosphere.

SERVICE APPLICATION

In response to a service rate of reduction in the brake pipe 10, the quick service and accelerated release device 79 (see FIG. 1A) becomes active to periodically vent brake pipe 10 air from chamber 114 below abutment 112 through valve 130 and choke 131 to atmosphere. This quick service reduction is applied periodically as long as the brake pipe 10 pressure continues to be reduced at a service rate, independent of the associated control valve device 13. Periodic reduction is effective because of the biasing spring 132 of valve 130 being weaker than the biasing spring 133 associated with valve 134 so that the valve 130 is actuated first upon the downward movement of abutment 112, and secondly the valve 134 is opened to vent fluid at a relatively faster rate from the upper chamber 111 of the device 79. This fluid is vented through passage 113, passage 110, valve 134, passage 135, choke 136, and valve 106 of the emergency application device 80 to atmosphere. This reduction of fluid pressure in chamber 111 above abutment 112 at a faster rate than the reduction of pressure in chamber 114 below this abutment, causes abutment 112 to move upwardly and shut off valves 130 and 134 until a further reduction of pressure in the brake pipe 10, and thus in the chamber 114, is effective to initiate another quick service cycle.

The drop in pressure in brake pipe 10 is also effective as has been broadly considered in causing an imbalance of forces across the service abutment 47 of the application device 14 to cause abutment 47 to move upwardly and permit fluid to flow from the first volume reservoir A to the second volume reservoir B through chokes 24a and 43 and also through choke 24a to the chamber 41 beneath abutment 40 in the relay device 15 through ports B2 and B4 and passage 94 to actuate that abutment upwardly and open the valve 29 to permit fluid to flow as has been described from the auxiliary reservoir 11 through application passage 31 to the brake cylinder 12. This flow will continue until the pressure in volume A equals the brake pipe 10 pressure which causes a balance of forces across the abutment 47 in the application device 14 and closes valve 26.

The volume chambers A and B and the choke 24a are sized such that chambers A and B will be equalized for a full service brake application, but for a partial service brake application, the closure of valve 26 insures that the chamber A has its pressure reduced only comparable to the reduction in the brake pipe 10, while the pressure in chamber B, which controls the relay valve device 15, is maintained at a pressure comparable to the desired pressure for the brake cylinder 12.

If there is a further drop in pressure in the brake pipe 10 to signal additional braking pressure, this is sensed by the application device 14 to move abutment 47 upwardly again to open valve 26 and permit reduction of fluid pressure in chamber A comparable to the additional reduction in brake pipe pressure. This causes additional flow of fluid from chamber A to chamber B and causes the relay device 15 to actuate its abutment 40 upwardly for applying more fluid from the auxiliary reservoir 11 through application passage 31 to the brake cylinder 12. When the brake cylinder 12 has been adjusted to the increased pressure in the volume chamber B, this condition is sensed by the relay device 15 to close the application valve 29.

At the same time that the brake cylinder 12 is being charged from the auxiliary reservoir 11 as described above, an additional quick service reduction in the brake pipe 10 is provided by a circuit through the limiting device 77, which has its valve 139 open at this time. Brake pipe air is thus applied from the brake pipe chamber 17 through passage 18, passage 138, choke 138a, valve 28, passage 140, quick service volume 141, passage 144, valve 139 of limiting device 77 in its open position, and choke 143 to the application passage 31 from which it flows to the brake cylinder 12 through a fluid circuit that has been described. Spring bias in the limiting device 77 is such that fluid pressure in chamber 142 above piston 143 will actuate valve 139 to a closed condition against its lower seat 146 when the brake cylinder has been charged to approximately 10 pounds pressure to terminate quick service operation.

EMERGENCY APPLICATION

To obtain an emergency application, an emergency rate of brake pipe reduction compresses the emergency application spring 103 in emergency application and stability device 80 and closes the quick action charging and stability valve 105, thus cutting off the connection of brake pipe fluid to the quick action chamber 78. The valve 106 is also closed which normally permits venting of the quick action chamber during quick service operation. As the abutment 104 is moved upwardly, valve 147 is opened to permit flow of fluid from the quick action chamber 78 through passages 110 and 148, valve 147, and passage 149 to a chamber 150 of vent valve device 81. This actuates abutment 151 downwardly to open valve 152 and vent brake pipe fluid through passages 16, 153, and 154 to atmosphere. Emergency venting of the quick action chamber 78 at a rate to insure the stopping of a train before brakes can be released is accomplished by passage of fluid to atmosphere from quick action chamber 78 through passage 110, passage 148, valve 147 in its open position, passage 149, passage 155, and choke 156. It is to be understood that the vent valve device 81 can have its structure provided similar to the vent valve device used in the ABD valve if desired, rather than using the ball poppet type valve 152 structure as schematically illustrated.

The application and relay valve devices 14 and 15 (see FIG. 1B) respectively are actuated to open their respective valves 26 and 29 as in a service application to provide for pressurization of the brake cylinder 12. A reduction in brake pipe pressure in chamber 56 of the service cut off and proportioning device 51 renders this device operable to cut off supply to the brake cylinder 12 from the auxiliary reservoir 11, and opens valve 50 to permit flow from the emergency reservoir 53 to the brake cylinder 12 in a manner that has been heretofore described.

Because of depletion of the brake pipe pressure, the abutment 47 of the application device 14 (see FIG. 1B) is maintained in its upward position to permit equalization in pressure of the reservoirs A and B (for a fully loaded vehicle) as is accomplished for a full service brake application. This maintains a fluid circuit from the auxiliary reservoir 11 through the relay valve 29 to closed valve 36 of proportioning device 51. The stepped piston 52 provides that the piston 52 will move downwardly to a lap position when brake cylinder pressure is 120% of full service pressure to close both valves 36 and 50. It will be apparent that this mode of operation in establishing an emergency brake application is compatible with conventional ABD braking on other interchange cars in a train in that it provides for comparable braking pressures and rates of flow in charging the brake cylinder 12, without requiring an inshot valve to regulate the rate of charge of the brake cylinder 12. In case of leakage from the brake cylinder 12, the proportioning device 51 will again actuate its piston 52 upwardly to open valve 50 and replenish the brake cylinder 12 to compensate for the leakage.

ACCELERATED RELEASE OF SERVICE APPLICATION

When the brake pipe pressure increases relative to quick action chamber pressure following a service application by an amount to overcome the bias jointly of quick service spring 170 emergency reservoir pressure, and spring 171a in the accelerated release and quick service device 79 (see FIG. 1A), the abutment 112 moves upwardly to an extent to open valve 172 and permit flow of fluid from the emergency reservoir 53 to the brake pipe 10. The emergency reservoir 53 is connected to the brake pipe 10 at this time through passage 54, valve 172, choke 172a, check valve 173, passage 115, air cleaner 17 and passage 16.

In response to the building up of brake pipe pressure above the abutment 47 in the application control device 14 (see FIG. 1B), abutment 47 is moved downwardly to open valves 19 and 90 to provide respectively for charging of the control device 13 and venting the brake cylinder 12 as has been heretofore considered. The closure of valve 26 above abutment 47, closes a passage from volume A to volume B and the volume A is recharged as has been heretofore described. The opening of valve 90 by the downward movement of abutment 47 vents fluid from the volume chamber B through choke 43, passage 27, passage 137, passage 94, valve 90, retaining choke 95 and retainer pipe 96 to atmosphere. This causes the relay device 15 to move its abutment 40 downwardly, closing valves 28 and 29. The closure of valve 29 prevents further flow from the auxiliary reservoir 11 to the brake application passage 31.

ACCELERATED RELEASE OF EMERGENCY APPLICATION

When the brake pipe pressure increases relative to quick action chamber pressure following an emergency application by an amount to overcome the bias jointly of quick service spring 170 and accelerated release spring 171 in the accelerated release and quick service device 79 (see FIG. 1A), the abutment 112 moves upwardly to an extent to open valve 172 and permit flow of fluid from the emergency reservoir 53 to the brake pipe 10. Because of there having been an emergency application, there is little fluid pressure on either side of the abutment 112, and thus, to protect against a false release because of small changes in fluid pressures in the chambers adjoining the abutment 112, the abutment 112 is additionally biased by spring 171 at this time by the contact of piston 180 against the abutment 112. Piston 180 is normally held off of the snap ring 181 by pressurization of the chamber 111 but with materially reduced pressure in this chamber, because of there having been an emergency application, piston 180 is moved downwardly as described to insure that substantial build up of brake pipe pressure characteristic of a release signal will be required in order to open the valve 172 and provide for the flow of fluid from the emergency reservoir 53 to the brake pipe as has been described to provide accelerated release.

The increased pressure in the brake pipe 10 causes the abutments to move downwardly in both the valves 14 and 15 (see FIG. 1B) as has been described, thus closing the connection of the auxiliary reservoir 11 to the application passage 31 and permitting pressure in passage 31 to be reduced to atmosphere through the check valve 93 and valve 90 as has been described. This relieves pressure in the chamber beneath the stepped piston 52 of the proportioning device 51 (see FIG. 1A). As pressure builds up in the brake pipe 10, pressure in the brake pipe chamber 56 of the proportioning device 50 causes piston 52 to move downwardly and be restored to its normal position in which its lower valve 36 is opened and its upper valve 52 is closed. This permits the venting of fluid from the brake cylinder 12 through passage 37, valve 36, passage 35, choke 34, passage 33, valve 32, passage 31, check valve 93, passage 94, valve 90, choke 95 and passage 96 to atmosphere through a retaining valve (not shown).

BRAKE CYLINDER RELEASE

To illustrate the mode of operation of the system in the manual release of fluid from the brake cylinder 12, it will be assumed that there has been a reduction in pressure in brake pipe 10 to signal a brake application, and the sensing of such reduction has caused the service application valve device 14 to permit fluid from the auxiliary reservoir 11 co be applied to brake application passage 31 through the relay device 15. This fluid is applied to the brake cylinder as has been described.

If, while the brakes are applied at either emergency or service pressure, or when a car is set out of a train, an operator wishes manually to release the brakes of the car, he actuates handle 74 of the duplex release device 73 and thus momentarily applies fluid from auxiliary reservoir 11 to the pressure chamber 180 below the abutment 181 of the release valve device 75. Fluid is applied to chamber 180 under these conditions from the duplex release device 73 through passage 182, valve 183 and passage 184.

The movement of abutment 181 upwardly opens valves 185 and 186 above the abutment 181 and subsequently closes valves 32 and 183 below the abutment 181. The opening of valve 186 causes fluid to flow from the brake application passage 31 through valve 186 to the chamber 180 below the abutment 181 to maintain the abutment 181 actuated in its upper position in case of an emergency application after the manual release of the duplex release handle 74. The opening of valve 185, vents fluid from the brake cylinder 12 to atmosphere in case of a service application through passage 37, valve 36 of proportioning valve device 51, passage 35, choke 34, passage 33 and valve 185 to atmosphere. Chamber 188 above abutment 181 is vented through passage 189.

When the car is subsequently recoupled into a pressurized brake line, brake pipe 10 becomes pressurized and causes service application valve device 14 to be restored to its normal position, wherein the relay valve device 15 is actuated downwardly to close its valve 29 and thus disconnect the auxiliary reservoir 11 from the brake application passage 31. When this is done, the brake application passage 31 becomes vented to atmosphere through check valve 93, passage 94, valve 90, choke 95, and passage 96 to atmosphere. Thus fluid pressure in chamber 180 below the abutment 181 becomes reduced in pressure to permit the abutment 181 to be actuated to its lower position by spring 192.

If for some reason the auxiliary reservoir 11 is at a higher pressure than the brake pipe 10 when the brake pipe pressure is restored to normal as in coupling the car into a train, the service application device 14 does not reset to normal, but when the brake cylinder pressure is substantially reduced below piston 194 of reset device 76, the application of substantial brake pipe pressure to chamber 117 above piston 194 actuates the piston 194 downwardly to open valve 195 and permit fluid pressure in chambers A and the auxiliary reservoir 11 to be reduced to the pressure of brake pipe 10 through a check valve 196. This permits valve devices 14, 15 and 75 to be restored to their normal positions.

BRAKING SELECTED BY LOAD OF VEHICLE

As compared to the general practice in empty-load braking for interchange vehicles that requires an additional volume in parallel with a brake cylinder, a proportioning valve comparing supply pressure with brake cylinder pressure, and a selecting changeover valve in order to selectively reduce the braking for a lightly loaded vehicle, the system according to the present invention requires only modification of the volume of the chamber B (see FIG. 1B) to compensate for vehicle loads together with a proportioning valve 24 limiting pressure reduction in volume A. In fact, the variable volume 61 of load sensing cylinder 60, when used, can be sized to be substituted for the volume B in accordance with the requirements of practice, thus making it unnecessary to have the separate volume chambers B and 61 that are illustrated.

Assuming 70 pounds pressure is normally in the brake pipe 10, volume A is normally at 70 pounds pressure and connected volumes B and 61 are so sized that when piston 60 is positioned by a loaded car, volumes A and B become equalized for a full service brake application at 50 pounds pressure. The 50 pounds pressure in volume B is thus translated by the relay device 15 into a like pressure in brake cylinder 12.

For an empty car, however, the volume 61 is expanded by movement of piston 60 upwardly, and a similar reduction for a full service application of pressure in volume A to 50 pounds, results in a reduced pressure in volume B because of the expanded volume 61 in accordance with the sensing of an empty car. Thus the same volume of fluid flows from volume A to volume B for an empty car as for a loaded car, but the pressure in volume B and in the brake cylinder 12 is reduced for the empty car because of the expanded volume 61. This causes the pressure in volume B for an empty car to be only a fixed percentage, such as 60% of the pressure in volume A. Because of this reduced pressure in volume B for an empty car as compared to a loaded car, the pressure in the brake cylinder 12 is similarly governed by the relay valve device 15. Proportionate braking is provided for intermediate car weights.

In case of an over reduction in the pressure in brake pipe 10 below 50 pounds pressure, proportioning valve 24 cuts off delivery of fluid from volume A to volume B, thus insuring that an over reduction in the brake pipe cannot cause an over energization of the brake cylinder 12 beyond its normal pressure for a full service application of the brakes of an empty car.

In the case of an emergency application of the brakes of an empty car, the system follows the above described mode of operation for a full service application wherein the proportioning valve 24 cuts off the connection of volume A to volume B when volume A is reduced to 50 pounds pressure, and the reduced application pressure for an empty car as sensed in passage 35 is used to govern the proportioning device 51 (see FIG. 1A) and the cut off device 200 to cause an emergency application to be 120% of a full service application for the empty car. When the car is sensed as being loaded, the emergency brake application is of course 120% of full service pressure for the loaded car.

To provide the above described mode of operation, the proportioning valve device 24 (see FIG. 1B) has a stepped piston 240 having its larger abutment portion subject to actuation by pressure in a chamber 243 that is directly connected to volume A and its smaller opposing abutment surface being governed by pressure in a chamber 241 that is connected through a check valve 242 to the emergency reservoir 53 through passage 84. Normally, the piston 240 is operated to the left to open check valve 242 by a detent 240A and to open the valve 244 to permit flow of fluid from volume A through passage 24b, choke 24c, and choke 24a to the lower chamber 45 of the application control device 14. The choke 24a and also the choke 25a are provided to limit surges of fluid in the chambers 45 and 46 on the opposite sides of abutment 47 in the application valve device 14.

The choke 24c should be sized to provide that the reduction in pressure in chamber A is at substantially the same rate as the reduction in pressure of the brake pipe 10 and the auxiliary reservoir 11 during a service reduction in the brake pipe 10. The rate of reduction of the auxiliary reservoir 11 is regulated to substantially correspond to the pressure reduction in brake pipe 10 by choke 34 in the brake application passage 33.

A passage in parallel with valve 244 for governing flow of fluid from chamber A to passage 24b is provided by a 20 pound check valve 168 that is opened whenever there is a difference in pressure greater than 20 pounds between the pressure in volume A and pressure in passage 24b. The check valve 168 is provided to permit volume A to be effective to provide braking under a special condition wherein there has been a release of the brakes, and the system has not had time to be fully charged before a subsequent brake application is made. Under this condition, volume A has not had time to be fully charged, but a limited brake application can be applied by the opening of the 20 pound check valve 168 which senses a difference in pressure between volume A and the pilot control passage 24b. Valve 168 does not open under normal operating conditions because of the proportioning valve 244 being normally open and the application valve 26 being normally closed, thus establishing the same pressure on both sides of the check valve 168. During a normal brake applicaton, there is not a greater pressure across check valve 168 than the 20 pounds at which it is assumed to be set.

Valve 242 in the proportioning device 24 is closed when volume A pressure is reduced to 50 pounds to maintain a 70 pound reference pressure in chamber 241 even though emergency reservoir pressure may be subsequently reduced, as in an emergency brake application.

UNIVERSAL VALVE DEVICE

The control valve device 13 that has been described with reference to FIGS. 1A and 1B is perhaps of greatest utility where it can be used as a part of new car equipment so that new shorter stroke brake cylinders with slack adjusters, for example, can readily be used to take advantage of a material saving in air consumption that can be accomplished. However, there are conditions to be encountered in practice where the features of the proportioning braking as has been described are not required, and under these conditions it may be desirable to delete parts of the equipment that are not necessary. Thus it is proposed that the control valve 13 be constructed to have the proportioning volume chambers A and B and the associated proportioning valve 24 readily detachable and provide modified fluid passages to permit an alternate structure for operating control valve device 13 comparable to the operation of a conventional ABD valve in a conventional displacement brake control system.

The basic universal structure therefore comprises the pipe bracket 70 (see FIG. 1A) having the service portion 71 secured thereto at the right of the pipe bracket as is illustrated in FIG. 1B and the emergency portion secured to the left side of pipe bracket 70 as shown in FIG. 1A, the service and emergency portions 71 and 72 are preferably constructed in respective integral housings, except that the housing for the service portion 71 does not contain the proportioning valve 24, volume chambers A and B, and associated check valves. This apparatus is secured to the outside of the service portion 71 housing.

With reference to FIG. 2, when the volume chambers A and B are not used, as in the modified form of the invention, a cover 85 is secured to the housing 71 to connect passages 23, 20 and 24b and plug passage 34. A plate 86 is used to plug port B1 because of the deletion of the volume chamber B and to close port B3 because valve 29 of relay valve device 15 is not required and connection is made of port B2 to ports B4 and B5 through a reverse check valve 93. This insures correct performance of quick service valve 28 when the system is used for conventional brake piston displacement braking.

When the control valve device 13 is operated without the volume chambers A and B and without the proportioning valve device 24, using the alternate structure that has been described, charging of the auxiliary reservoir 11 takes place as has been described, except that the check valve 22 is no longer included in the charging passages. In the application charging and release device 14, the chamber 45 beneath the abutment 47 is now subject to pressure of the auxiliary reservoir 11 rather than the volume chamber A which has been disconnected. This is because the passage 24b feeding the chamber 45 is now connected to the auxiliary reservoir passage 23 through stabilizing choke 24a.

The mode of operation upon sensing a brake pipe reduction is similar to that which has been described in that the application valve 26 is opened by the upward movement of abutment 47, and this applies fluid from the auxiliary reservoir 11 to the chamber 41 beneath the abutment 40 for opening quick service valve 28 to propagate the brake pipe reduction to the next car. Fluid reaches the brake cylinder 12 through passages 137 and 31 that have been connected by plate 86 (see FIG. 2). The brake cylinder 12 is supplied with fluid from the auxiliary reservoir through these passages for both service and emergency braking. Operation for a full service application equalizes the auxiliary reservoir 11 pressure with the brake cylinder 12 pressure according to usual practice for displacement braking.

For an emergency brake application, the system operates as has been described except that operation of the devices 14 and 15 is modified as has been described.

CHANGE IN SYSTEM PRESSURE

In switching of a car having a brake system according to the preferred embodiment of the present invention from one train to another, or to a different position in the same train, it is possible that the chamber A can be charged to a pressure different than the normal pressure of the brake pipe at the point in a train in which the car is last coupled. If the pressure in chamber A is less than brake pipe pressure, it is charged to brake pipe pressure through passage 20, but if it is higher than brake pipe pressure, it is not equalized with the pressure in brake pipe 10. The general procedure upon recoupling of a car into a train is to charge the train braking system and then make a brake application followed by a release. Accelerated release applies fluid to brake pipe 10 from the emergency reservoir 53 through valve 172 of accelerated release and quick service device 79. This materially reduces pressure in the auxiliary reservoir 53 and connected auxiliary reservoir 11 and volume A, thus dissipating any excessive pressure there might be because of prior connection in a higher pressure braking system such as 110 pound brake pipe system of a passenger train. The system will then be recharged in the recoupled car to the brake pipe level of adjoining cars.

The valves in the control valve device 13 are preferably ball poppet type valves, as has been shown, for purposes of reliable operation, requiring a minimum amount of maintenance, and requiring a minimum travel of operating abutments, thus permitting the use of less expensive flat differential diaphragms as compared to conventional conical diaphragms required for operating ABD slide and spool valves and the like. A further advantage to the use of the ball poppet valves is in the greatly reduced cost of manufacture as compared to conventional slide and spool valves.

The present invention makes possible faster brake application throughout a train, and faster release by a saving in the quantity of fluid required to be moved for brake application and release. This is due in part to the possibility of applying brakes through a shorter piston stroke by using slack adjusters and/or using smaller brake cylinders operated at higher pressures. This is all accomplished with brake application timing through the use of volume chambers A and B comparable to timing of brake applications on other interchange cars in a train that may be equipped with vehicles having conventional AB or ABD control valves.

By the relatively simple means for providing proportional braking in accordance with the load of a vehicle, the control valve device 13 provided by the present invention can be used on light rail vehicles where load sensitive control is required.

A still further advantage of the present invention is that the basic structure can be universal in character and be modified readily in accordance with the requirements of practice to provide a control valve device having a conventional displacement mode of operation, a relay control valve device having the volume chambers A and B for equalization control, or a control valve device adapted to be governed in accordance with the load of the vehicle.

Having thus described a fluid brake control system as a preferred embodiment of the present invention, it is to be understood that various modifications and alterations may be made to the specific embodiment shown without departing from the spirit or scope of the invention.

What is claimed is:

1. A fluid brake control system for governing application and release of brakes of an interchange vehicle having a brake control pipe, an auxiliary fluid reservoir, a fluid brake cylinder, and a brake control device sensing changes in fluid pressure in the brake pipe for at times governing application of fluid to the brake cylinder from the auxiliary reservoir and at other times for releasing fluid from the brake cylinder wherein improvements in the brake control device comprises;
   (a) first and second volume chambers both proportionally substantially smaller in volume than the respective auxiliary reservoir and brake cylinder displacement volumes,
   (b) means including the brake control device for charging the first volume chamber from the brake pipe and for preventing fluid flow from the auxiliary reservoir to the first volume chamber,
   (c) means including the brake control device for charging the second volume chamber from the first volume chamber upon sensing a reduction of pressure in the brake pipe, and
   (d) relay valve means sensing a difference in fluid pressure between brake cylinder pressure and pressure in the second volume chamber for governing flow of fluid from the auxiliary reservoir to the brake cylinder.

2. A fluid brake control system according to claim 1 wherein the ratio of the sum of the volumes of the first and second chambers to the volume of the first chamber is approximately the same as the ratio of the sum of the volumes of the auxiliary reservoir and the brake cylinder displacement volume to the volume of the auxiliary reservoir.

3. A fluid brake control system according to claim 2 wherein choke means is provided to cause reduction in pressure in the first volume chamber at a rate comparable to a service rate of reduction of pressure in the brake pipe.

4. A fluid brake control system according to claim 1 wherein means including a proportioning valve is provided for limiting pressure reduction in the first volume chamber to a fixed percentage of a reference pressure.

5. A fluid brake control system according to claim 4 wherein the reference pressure is the pressure in an emergency reservoir.

6. A fluid brake control system according to claim 1 wherein service cut-off and proportioning valve means is provided for obtaining an emergency brake application by pressurizing the brake cylinder first from the auxiliary reservoir and then from an emergency reservoir in fixed proportions.

7. A fluid brake control system according to claim 6 wherein the proportioning valve means has first and second valves governing charging of the brake cylinder from the auxiliary reservoir and emergency reservoir, respectively, and proportioning piston means for first opening the first valve while maintaining the second valve closed, secondly opening the second valve while maintaining the first valve closed and finally closing both valves when the brake cylinder has been pressurized to full emergency pressure.

8. A fluid brake control system according to claim 7 wherein means is provided for rendering the proportioning means effective to open only the first valve for a service brake application.

9. A fluid brake control system according to claim 6 wherein the cut-off valve means comprises;
(a) a differential abutment subject to actuation by opposing auxiliary reservoir and brake cylinder pressures,
(b) a first control valve means being opened by movement of the abutment in one direction for delivering fluid from the auxiliary reservoir to the brake cylinder, and
(c) a second control valve means being opened by movement of the abutment in the opposite direction when the brake cylinder is charged to substantially full service pressure for delivering fluid from the emergency reservoir to the brake cylinder.

10. A fluid brake control system according to claim 1 wherein means is provided for varying the effective volume of the second volume chamber in accordance with the weight of the vehicle.

11. A fluid brake control system according to claim 10 wherein proportioning means including a normally open valve is provided for permitting flow of fluid from the first volume chamber to the second volume chamber only until pressure in the first volume chamber is reduced to a fixed proportion relative to a reference pressure.

12. A fluid brake control system according to claim 11 wherein the proportioning means comprises a stepped piston for actuating the normally open valve, one face of the piston being subject to pressure of the first volume chamber and an opposite face of the piston being subject to the reference pressure.

13. A fluid brake control system according to claim 12 wherein the reference pressure is pressure of an emergency reservoir.

14. A fluid brake control system according to claim 13 wherein the proportioning means is effective when its stepped piston is actuated to a position closing the normally open valve to prevent further reduction of pressure in the first volume chamber for closing a reference pressure control valve for maintaining fixed emergency reservoir reference pressure acting on the piston, irrespective of subsequent reduction of pressure in the emergency reservoir.

15. A fluid brake control system according to claim 1 wherein service limiting valve means is provided for sensing a drop in brake pipe pressure and delivering fluid from the brake pipe to the brake cylinder only until pressure in the second volume chamber reaches a fixed level.

16. A fluid brake control system according to claim 1 wherein continuous quick service valve means is provided for sensing a drop in brake pipe pressure and for venting fluid periodically from the brake pipe and from a quick action chamber as long as the brake pipe pressure continues to be reduced independent of the associated brake control device.

17. A fluid brake control system according to claim 1 wherein emergency valve means is provided having a differential abutment sensitive to differences in brake pipe and quick action chamber pressures for sensing an emergency rate of reduction of brake pipe pressure and in accordance therewith for actuating vent valve means to vent fluid from the brake pipe at an emergency rate.

18. A fluid brake control system according to claim 1 wherein means is provided for sensing an increase in brake pipe pressure relative to quick action chamber pressure for delivering fluid from the brake cylinder and the emergency reservoir to the brake pipe to provide accelerated release of brakes of other vehicles of a train.

19. A fluid brake control system according to claim 1 wherein means is provided for releasing fluid from the brake cylinder in response to manual actuation of a release valve.

20. A fluid brake control system for governing application and release of brakes of an interchange vehicle having a brake control pipe, an auxiliary reservoir, an emergency reservoir, a fluid brake cylinder, and a brake control device contained in a housing for sensing changes in fluid pressure in the brake pipe for at times governing application of fluid to the brake cylinder from the auxiliary reservoir and the emergency reservoir and at other times for releasing fluid from the brake cylinder wherein improvements in the brake control device comprise;
(a) first and second fluid volume chambers external of the brake control device connected by passages to ports of the brake control device,
(b) covers for the ports associated with the passages, and
(c) means for connecting the volume chambers and the covers alternately to the brake control device and for at times providing a full service brake application by rendering the brake control device operable to govern brake cylinder pressure in accordance with the equalizing of the brake cylinder pressure with pressure in the volume chambers, and at other times in accordance with the equalizing of the brake cylinder pressure with pressure in the auxiliary reservoir respectively.

21. A fluid brake control system according to claim 20 wherein when the volume chambers are connected to the brake control device, means is provided including a proportioning valve device for preventing flow of fluid from the first volume chamber to the second volume chamber when the ratio of pressures of the emergency reservoir and the first volume chamber is below a fixed ratio.

22. A fluid brake control system for governing application and release of brakes of an interchange vehicle having a brake control pipe, an auxiliary fluid reservoir, an emergency fluid reservoir, a fluid brake cylinder and control means sensing changes in fluid pressure in the brake pipe for at times governing application of fluid to the brake cylinder from the reservoirs, and at other times for releasing fluid from the brake cylinders and recharging the reservoirs, wherein improvements in the brake control device comprise;
(a) application control means including proportioning valve means governed by brake pipe pressure and effective upon sensing an emergency rate of reduction in the brake pipe to first charge the brake cylinder to substantially full service pressure from the auxiliary reservoir and then shift charge of the brake cylinder from the auxiliary reservoir to the emergency reservoir,
(b) the proportioning valve means being effective to lap the charging of the brake cylinder from the emergency reservoir when the brake cylinder has been charged to a pressure that is a fixed percentage above full service braking pressure.

23. A fluid brake control system according to claim 22 wherein the fixed percentage of full service braking pressure is approximately 120%.

24. A fluid brake control system according to claim 22 wherein the proportioning valve means comprises stepped piston means for sensing when a force on one face of the piston means of brake cylinder pressure substantially equals a total force on an opposite and larger face of the piston means generated by pressure from the auxiliary reservoir for lapping the charging of the brake cylinder.

25. A fluid brake control system according to claim 24 wherein the stepped piston means has an associated chamber subject to brake pipe pressure for preventing operation of the proportioning valve means during a service brake application.

26. A fluid brake control system according to claim 22 wherein the application control means comprises cut-off valve means having a first control valve means for governing application of fluid to the brake cylinder from the auxiliary reservoir, and having a second control valve means for governing application of fluid to the brake cylinder from the emergency reservoir.

27. A fluid brake control system according to claim 26 wherein the cut-off valve means comprises differential abutment means subject to opposing auxiliary reservoir and brake cylinder pressures for operating the first and second control valves of the cut-off valve means.

28. A fluid brake control system according to claim 27 wherein the first and second control valves are poppet type valves disposed on opposite sides of the abutment means in normally closed positions, subject to actuation to open positions upon movement of the abutment means respectively in one direction or another.

29. A fluid brake control system according to claim 27 wherein;
(a) means is provided including the first control valve means for delivering fluid to the brake cylinder from the auxiliary reservoir when the auxiliary reservoir pressure is materially higher than the brake cylinder pressure, and
(b) means is provided including the second control valve means for delivering fluid to the brake cylinder from the emergency reservoir when difference in pressure between the brake cylinder pressure and the auxiliary reservoir pressure is materially reduced.

30. A fluid brake control system for governing application and release of brakes of an interchange vehicle having a brake control pipe, an auxiliary reservoir, an emergency reservoir, a fluid brake cylinder, and a brake control device for sensing changes in fluid pressure in the brake pipe for at times governing application of fluid to the brake cylinder from the auxiliary reservoir and emergency reservoir and at other times for releasing fluid from the brake cylinder, wherein improvements in the brake control device comprise:
(a) a universal control valve device,
(b) means for adapting the universal control valve device to either of two alternative modes of operation,
(c) the adapting means in a first state governing operation of the brake cylinder to a braking pressure determined by the relative fluid pressures in the auxiliary reservoir and in the brake cylinder,
(d) the adapting means in a second state operating the brake cylinder to a braking pressure determined by the relative fluid pressures in two volume chambers having volumes substantially less than and proportional to those of the auxiliary reservoir and brake cylinder displacement volumes respectively.

31. A fluid brake control system according to claim 30 wherein the adapting means comprises certain fluid passages of the universal control valve device adapted to be selectively restricted or connected with other passages in accordance with which of the alternate modes of operation is selected.

32. A fluid brake control system according to claim 31 wherein the certain fluid passages of the universal control valve device are in part restricted and in part connected together in the first state of the adapting means.

33. A fluid brake control system according to claim 31 wherein the certain fluid passages are selectively connected to passages leading to the volume chambers respectively when the adapting means is in the second state.

34. A fluid brake control system according to claim 32 wherein the adapting means comprises a detachable housing cover for selectively connecting the certain passages of the universal control valve device together when the adapting means is in the first state.

35. A fluid brake control system according to claim 33 wherein the adapting means in its second state comprises first and second volume chambers, both proportionally substantially smaller in volume than the respective auxiliary reservoir and brake cylinder volumes, selectively connected with the certain passages of the universal control valve device.

36. A fluid brake control system for governing application and release of brakes of an interchange vehicle having a brake control pipe, an auxiliary fluid reservoir, a fluid brake cylinder, and a brake control device having emergency and service portions secured to a pipe bracket for sensing changes in fluid pressure in the brake pipe and for at times governing application of fluid to the brake cylinder from the auxiliary reservoir, and at other times for releasing fluid from the brake cylinder, wherein an improved service portion comprises;
  (a) application, charging, and release means being poppet type valves respectively disposed partly on one side and partly on an opposite side of a differential abutment and operably associated with the abutment for respectively applying fluid pressure to the brake cylinder, charging the auxiliary reservoir, and releasing fluid from the brake cylinder in accordance with the abutment sensing differences in pressure of fluid in the brake pipe as compared to a reference fluid pressure, and
  (b) relay valve means for governing pressure in the brake cylinder in accordance with sensing brake cylinder pressure relative to a reference pressure.

37. A fluid brake control system according to claim 36 wherein means is provided for selectively rendering the relay valve means effective or ineffective for governing pressure in the brake cylinder.

38. A fluid brake control system according to claim 36 wherein the service portion comprises limiting valve means for limiting delivery of fluid from the brake pipe to the brake cylinder during a brake application in accordance with brake cylinder pressure.

39. A fluid brake control system according to claim 38 wherein the limiting valve means comprises a poppet valve that is normally open to permit delivery of brake pipe fluid to the brake cylinder but is closed when pressure in the brake cylinder is built up to a predetermined value.

40. A fluid brake control system according to claim 36 wherein the service portion comprises brake cylinder release means having poppet type valves respectively disposed partly on one side and partly on the opposite side of a differential abutment and operably associated therewith, the differential abutment being adapted to compare spring biasing pressure on one side of the abutment with fluid pressure admitted to a pressure chamber on the other side of the abutment in response to a manual release designation for closing a brake cylinder application passage and exhausting fluid from the brake cylinder.

41. A fluid brake control system according to claim 40 wherein the brake cylinder release means comprises a normally closed poppet type valve that is opened in response to the manual release designation for admitting fluid from the application passage to the pressure chamber for maintaining the brake cylinder release means actuated as long as the application passage is pressurized.

42. A fluid brake control system according to claim 36 wherein the service portion has reset valve means for permitting reduction of pressure in an application passage substantially to pressure in the brake pipe when pressure in the brake pipe is substantially greater than pressure in the brake cylinder.

43. A fluid brake control system according to claim 42 wherein the reset valve means has a normally closed poppet type valve that is opened upon sensing a greater pressure in the brake pipe than pressure in the brake cylinder for permitting reduction of pressure in the application passage to substantially correspond to the pressure in the brake pipe.

44. A fluid brake control system for governing application and release of brakes of an interchange vehicle having a brake control pipe, auxiliary and emergency reservoirs, a fluid brake cylinder, and a brake control device having emergency and service portions secured to a pipe bracket for sensing distinctively service and emergency rates of change respectively in fluid pressure in the brake pipe for at times selectively governing application of fluid to the brake cylinder and at other times for releasing fluid from the brake cylinder, wherein an improved emergency portion of the brake control device comprises;
  (a) application control means including proportioning valve means governed by brake pipe pressure and effective upon sensing an emergency rate of reduction in the brake pipe to first charge the brake cylinder to substantially full service pressure from the auxiliary reservoir and then shift charge of the brake cylinder from the auxiliary reservoir to the emergency reservoir,
  (b) the proportioning valve means being effective to lap the charging of the brake cylinder by the emergency reservoir when the brake cylinder has been charged to a pressure that is a fixed percentage above full service braking pressure.

45. A fluid brake control system according to claim 44 wherein the proportioning valve means comprises a proportioning device having a pressure chamber connected to the brake pipe, the pressurization of which during a service brake application renders the proportioning valve means inoperable to shift the charging of the brake cylinder from the auxiliary reservoir to the emergency reservoir.

46. A fluid brake control system according to claim 44 wherein the proportioning valve means comprises a cut-off valve device having,
  (a) a differential abutment for sensing differences in pressure of chambers on opposite sides of the abutment subject to application pressure from the auxiliary reservoir and brake cylinder pressure respectively,
  (b) poppet type valve means disposed on opposite sides of the abutment subject to actuation by the abutment for governing the charging of the brake cylinder from the auxiliary reservoir and from the emergency reservoir respectively.

47. A fluid brake control system according to claim 46, wherein the poppet type valve means includes auxiliary and emergency poppet valves disposed on opposite sides of the abutment for governing flow of fluid from the auxiliary and emergency reservoirs respectively, wherein actuation of the abutment in one direction charges the brake cylinder from the auxiliary reservoir through the auxiliary poppet valve, and actuation of the abutment in the opposite direction charges the brake cylinder from the emergency reservoir through the emergency poppet valve.

48. A fluid brake control system according to claim 47 wherein the auxiliary and emergency poppet valves charge the brake cylinder through the brake cylinder pressure chamber of the cut-off valve device.

49. A fluid brake control system according to claim 48 wherein a passage is provided for delivering fluid to the brake cylinder through the brake cylinder chamber of the cut-off device from the emergency reservoir at a restricted rate, irrespective of the condition of the emergency poppet valve.

50. A fluid brake control system according to claim 44 wherein the emergency portion comprises a combined quick service and accelerated release valve means comprising
(a) a valve device having a differential abutment sensing differences in pressure of chambers subject to pressure of the brake pipe on one side of the abutment and pressure of a quick action chamber on the other side of the abutment, and
(b) a pair of poppet type valve means operably connected to the abutment on one side thereof and adapted to be actuated sequentially in response to actuation of the abutment in one direction to alternately initiate the venting of fluid from the brake pipe and the quick action chamber in response to the valve device sensing reduction of pressure in the brake pipe relative to pressure in the quick action chamber.

51. A fluid brake control system according to claim 50 wherein the valve device has accelerated release valve means on the other side of the abutment comprising
(a) poppet type valve means operably connected to the abutment for connecting the emergency reservoir to the brake pipe when pressure in the brake pipe is higher than pressure in the quick action chamber so as to move the abutment in the opposite direction, and
(b) a spring biased piston on said other side of the abutment normally maintained separated from the abutment by quick action chamber pressure,
(c) the spring bias piston being rendered effective by depletion of pressure in the quick action chamber to load the abutment for preventing premature connection of the emergency reservoir to the brake pipe for accelerated release after an emergency brake application.

* * * * *